Patented Apr. 21, 1936

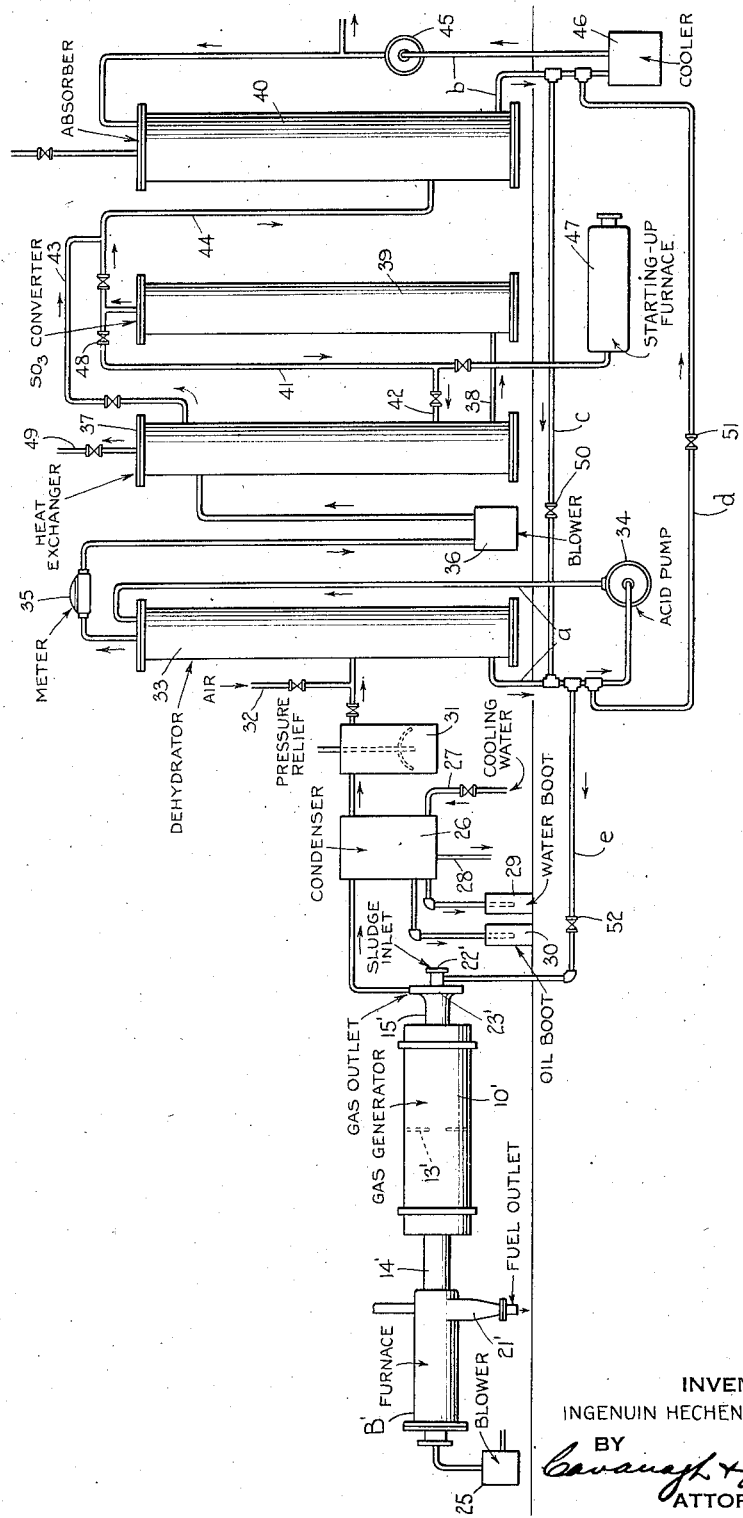

2,038,429

UNITED STATES PATENT OFFICE 2,038,429

CONTACT METHOD OF SULPHURIC ACID MANUFACTURE

Ingenuin Hechenbleikner, Charlotte, N. C., assignor to Chemical Construction Corporation, Charlotte, N. C., a corporation of Delaware Application November 17, 1931, Serial No. 575,549

4 Claims. (Cl. 23—173)

This invention relates to sulphuric acid manufacture, and has special reference to the provision of an improved contact method of making sulphuric acid.

In contact methods of suphuric acid manufacture, sulphur or pyrites or zinc sulphide ore is burned in the presence of air or oxygen in a burner or furnace where a mixture of $SO_2$ gas and air is produced, which mixture is then passed to a catalytic converter wherein the $SO_2$ gas is converted to sulphuric anhydride. The sulphuric anhydride is then passed through absorption apparatus where the final sulphuric acid product is obtained.

In the practice of this contact method of making sulphuric acid, it has long been known that the $SO_2$ gases generated in the burner or furnace must be purified to prevent the impurities therein from "poisoning" the contact or catalytic mass of the converter; and one of the chief problems has been to remove $SO_3$ mist which is formed and which is present in considerable amounts in the burner gas. In the old cold purification processes, it was necessary to cool the generated gases to approximately atmospheric temperature, remove moisture and filter out this $SO_3$ mist by means of large and expensive coke or mineral wool filters. It was necessary to completely remove this mist in order to prevent the poisoning of platinum catalyst then generally in use as well as to prevent the corrosion of the apparatus. Since brimstone has come into general use, and due to its great purity, the elaborate cold purification methods have become unnecessary, and yet the air used for burning the brimstone has to be dried to remove moisture and the temperature of the gases between the sulphur burner and the converter must be maintained at a point high enough (above the dew or condensation point of sulphuric acid) so as to prevent the formation of sulphuric acid mist.

I have discovered that sulphuric acid may be manufactured by producing an $SO_2$ gas substantially without the concomitant formation of $SO_3$, which $SO_2$ gas may then be converted catalytically to sulphuric anhydride. By substantially inhibiting the formation of $SO_3$, the tendency to or liability of formation of sulphuric acid mist is avoided. The $SO_2$ gas may thereby be generated without regard to the problem of moisture content thereof, the subsequent treatment of the $SO_2$ gas is thereby facilitated and the problem of catalyst poisoning by $SO_3$ mist is eliminated. This improved contact process of sulphuric acid manufacture comprises a prime object of my present invention.

In the practice of the invention exemplified herein, the $SO_2$ gas is produced from a sulphur containing body such as acid sludge obtained in the refining of petroleum, tar and other organic materials. I have found that acid sludge (which may contain sulphuric acid, sulphonic acids, sulphates, acid tars and other organic hydrocarbons) may be controllably reacted in a retort to produce $SO_2$ gas of relatively high concentration, as for example from 8 to 14% $SO_2$, and substantially free from either solid or vapor impurities, the gases produced consisting of $SO_2$ substantialy free from tarry vapors, $H_2S$ gas, $SO_3$, S and sulphuric acid vapors and containing only water in the form of steam and a minimum amount of light hydrocarbons which may be removed with little difficulty. I have furthermore found that the produced gases, after the removal of water and the small amount of light hydrocarbons, may readily be admixed with oxygen in the form of air and dried and may then be efficiently converted to sulphuric anhydride in a catalytic converter, preferably of the vanadium catalyst type, wherein a very high conversion yield of from 97 to 98% may be obtained. The provision of this improved method for the generation of $SO_2$ gas from acid sludge and the efficient conversion thereof to sulphuric anhydride is a further prime object of my present invention.

To the accomplishment of these objects and such ancillary objects as will hereinafter appear, my invention consists in the processes and steps of the processes hereinafter more particularly described and sought to be defined in the claims, reference being had to the accompanying drawing which shows a diagrammatic layout of the plant employed in the practice of the present process.

Referring now more in detail to the drawing, the process of my invention consists generally in producing $SO_2$ gas in a gas generator 10', which gas is laden with moisture, in flowing the thus generated gas through a condenser 26, in then admixing oxygen or air with the gas as at 32, in then flowing the mixture of $SO_2$ gas and oxygen through a dehydrator 33, thence through an $SO_3$ converter 39, and thereafter through an absorber 40 wherein the product acid is obtained.

In the gas generator 10' the $SO_2$ gas is produced in an atmosphere low in free oxygen, the oxygen content of the gas atmosphere being less than 10% by volume, the gases entering the gas generator having preferably an oxygen content of from 2 to 6%. In this gas generator $SO_2$ gas is produced substantially without any accompanying sulphuric acid or anhydride distillation. In the condenser 26, moisture in the gases is condensed and removed from the system and here any small traces of $SO_3$ if formed may be condensed and removed. The amount of air introduced at 32 is such that the ratio of oxygen to $SO_2$ gas entering subsequently into the converter 39 is of the order of 1.4 to 1. The $SO_2$ gas leaving the condenser 26 is substantially at room temperature (generally about 100° F.) and therefore contains moisture; and the dehydrator 33 functions to dehydrate the mixture of this gas with the air or oxygen.

In the more specific embodiment of the invention, the $SO_2$ gas is generated from acid sludge and the gas generator 10' is therefore designed especially for the treatment of acid sludge. This generator preferably comprises a rotary cylinder or drum made of iron or steel preferably interiorly subdivided by means of one or more annular members such as 13' into a plurality of separate and intercommunicating compartments. This drum retort is provided at its opposite ends with reduced cylinder sections 14' and 15' respectively which serve for the ingress and egress of the reacting constituents and resulting products for the retort. The construction and design of this retort may be varied within substantial limits and for a small plant such for example as a plant of two sludge ton daily capacity this retort may have an inside length of from 8 to 10 feet and an inside diameter of 2 feet. The rotational speed imparted to this retort may be of the order of 16 R. P. M.

The cylindrical end section 14' of the retort is made to serve as the intake end for combustion gases produced in a furnace B' with which is associated a furnace blower 25, and the opposite cylindrical end section 15' of the retort is made to serve as the exit or expulsion end for $SO_2$ gases produced in the retort or gas generator. Where the gas generator is employed for the treatment of acid sludge, the gas exit end 15' thereof is also made to serve as the inlet end for the acid sludge, the sludge being introduced into the retort 10' through a feed pipe 22', and the opposite end 14' is made to serve as the expulsion end for the carbonaceous residue of the sludge, the carbonaceous residue being removed from the system through a hopper 21', which hopper is sealed at its bottom by means of a slide door or the like. Since the retort or gas generator 10' is rotatable, the joints between the retort and the combustion furnace B' at one end and those between the retort and the gas outlet head 23' at the other end are suitably packed with some stuffing material. It is highly desirable to make these joints air-tight so as to prevent ingress of atmospheric air into the retort at either end or the loss of gases from the retort.

The gas generator and the process of generating the $SO_2$ gas therein are more specifically set forth and claimed in my copending applications Serial Nos. 568,051 and 568,050, now Patent No. 1,953,225, dated April 3, 1934, both filed Oct. 10, 1931.

The combustion gases employed may be obtained from a variety of sources and may be produced for example from the burning of oil, powdered coal, coke or other heat producing materials, and may also be produced from natural gas. The combustion gases may also be obtained by burning sulphur or hydrogen sulphide or similar sulphur containing compounds or products. The combustion gases provide an atmosphere in the retort or gas generator which aids in producing rapid as well as complete reduction and conversion of the sulphur containing compounds in the sludge to $SO_2$. I have found, however, that the free oxygen content in the reaction atmosphere in the retort should be of an amount insufficient to complete the subsequent sulphuric acid contact reaction, and I have empirically determined that the combustion gases should contain an oxygen content below 10% by volume and preferably between 2 to 6%. I have found that the control of the oxygen content or proportion in the combustion gases and in the reaction atmosphere of the retort is important in producing a number of advantageous results. The presence of free oxygen is, I believe, a factor in inhibiting the formation of $H_2S$ gas in the retort when it is operated at the critical temperature range, and is also a factor in effecting complete combustion of the furnace gases; and the maintenance of the low proportion of free oxygen is, I believe, a factor in giving rise to a reaction atmosphere in the retort wherein the desired reduction and conversion of the sulphur containing compounds to $SO_2$ is effected. Also with a low oxygen content danger of fires is obviated and oxidation of the hydrocarbons in the acid sludge is minimized. The copious evolution of the produced $SO_2$ gas in or about the middle section of the retort in all probability provides a protective blanket between the combustion gases and the lighter hydrocarbons distilled off in the gas exit end of the retort.

The production of an $SO_2$ gas substantially without the concomitant generation of $SO_3$ is of especial importance in the practice of my present invention. The operation of the gas generator is so predetermined and practiced that the $SO_2$ gas is generated substantially without any accompanying sulphuric acid or anhydride distillation and substantially without any conversion in the retort of $SO_2$ to $SO_3$. By means of my present process, the sludge body is gradually brought up to the higher temperatures, the gradual heating being a factor in avoiding such rapid heating or local overheating as causes a distillation of $SO_3$. The avoidance of the formation of $SO_3$ at any stage of the process is very important, as aforesaid, since such $SO_3$ formation results in the creation of the acid mist which is a colloidal fume and which passes through the condenser, the converter and the absorber (in the subsequent apparatus) and out into the atmosphere and creates a great nuisance. Moreover, as above set forth, this $SO_3$ mist acts as a "poison" for the contact mass. I have found that the avoidance of $SO_3$ distillation is the result of a combination of reasons, comprising mainly first the fact that at the gas exit end of the retort the temperatures are too low for the distillation of $SO_3$, second, the fact that the range of reacting temperatures in the retort is suitably governed, and third, the fact that the rate of bringing up the sludge to the reaction temperatures is so controlled and gradual that the formation of $SO_3$ is inhibited, or if any is produced, it is reacted with the hydrocarbons to produce the reduction thereof to $SO_2$ so that ultimately no $SO_3$ accompanies the exit gases. The restriction of the free oxygen content in the retort is, I believe, also a factor in avoiding conversion of $SO_2$ to $SO_3$ in the retort.

For obtaining a preferred temperature and reaction control, the combustion gases may have entering temperatures varying from 1500° to 2500° F., and exiting temperatures of 240° to 260° F., while the temperature ranges for the sludge body in the retort when treating say a blended liquid sludge may be from 212° to 300° F. at the gas exit end of the retort, from 300° to 400° F. in the central zone of the retort, and from 400° to 420° F. at the gas entrant end of the retort.

The produced gases containing $SO_2$ and laden with moisture discharging from the retort and exiting at the gas outlet 23' are first led through the condenser 26 which may be cooled by water entering through the pipe 27 and passing out through the pipe 28. In this condenser the water and the small amount of oil present in the exit gases are condensed, and these separating into stratified layers are readily withdrawn into the water and oil boots 29 and 30. Here also may be removed any small traces of $SO_3$ if any are formed. It will be understood that if a substantial quantity of sulphuric acid mist were produced or formed prior to the condenser 26, the condenser would be inadequate to remove or scrub the same from the gases. The condenser serves also to cool the gases to a low temperature which is substantially room temperature and which more specifically is about 100° F. If desired, in order to prevent an undue rise in the pressure in the plant or system, a pressure relief valve such as 31 may be employed following the condenser 26.

The remainder of the plant apparatus illustrated in the drawing is intended for the subsequent conversion of $SO_2$ to sulphuric anhydride and sulphuric acid. The oxygen content of the $SO_2$ gas leaving the condenser being insufficient for the subsequent conversion step, oxygen or air is introduced as aforesaid at 32 into the gas line. I have found that to obtain a desired 97 to 98% conversion in a converter employing a vanadium compound contact mass, that for reasons hereinafter discussed, the ratio of oxygen to $SO_2$ entering the converter should be of the order of 1.4 to 1, the oxygen content being preferably between the limits of 1.3 to 1.6, 1.4 being the optimum value. Accordingly, at 32 sufficient air is added to the gases (already containing some oxygen) to produce the desired oxygen to $SO_2$ ratio. As shown, the air is preferably added in advance of the dehydrator 33 and after the cooler-condenser 26. By adding the air at this point, the volume of gas passing through the condenser is reduced, thus reducing the size of the condenser required; furthermore, if the air were added in advance of the condenser, all of the gases exiting from the condenser would be saturated with moisture and the dehydrating problem would be aggravated. By adding the air after the cooler and in advance of the dehydrator, the added air is only partly saturated with moisture and the load on the dehydrating tower is relieved. The air need not be pre-dried, the dehydrator being relied upon to dry the air as well as the $SO_2$ gas.

The dehydrator or drying tower 33 through which the mixture of air and $SO_2$ gas is passed is supplied with a stream of sulphuric acid moving countercurrent to the gas flow under the action of an acid pump 34 and circulating in the pipe system *a*, the sulphuric acid serving the purpose of drying the air and gas mixture. This mixture then passes through an orifice meter 35 into and through the blower 36 which acts in conjunction with the blower 25 of the furnace to cause or induce the gas flow through the system. From the blower the gas mixture is delivered to a heat exchanger 37 which functions to reheat the gases, preheating the same for the purpose of bringing them up to suitable conversion temperatures. It will be understood that the gases having passed through the condenser and drying tower have been cooled to a temperature below the catalytic conversion temperature and therefore require reheating.

The air and $SO_2$ gas mixture passes from the heat exchanger 37 through the pipe 38 into a catalytic converter 39. In the preferred practice of the present process this converter is of the vanadium type, the contact mass comprising vanadium compounds of any of a number of well known kinds. A vanadium catalyst is preferred, since it is not affected by such gaseous platinum contact mass "poisons" as chlorine and arsenic. I have discovered that with the use of vanadium contact mass it is highly desirable to maintain a ratio of oxygen to $SO_2$ entering the converter of the order of 1.4 to 1 in order to obtain the desired 97 to 98% conversion ordinarily obtained in commercial plants and without the use of an excessive amount of contact material. Since small traces of hydrocarbons may be found in the gases entering the converter, and since these require oxygen for their oxidation, sufficient oxygen should be added to the gases at 32 so that the ratio of 1.4 to 1 is maintained in the converter after the oxidation of such compounds. I have found that both the equilibrium and the velocity of reaction are affected by the oxygen to $SO_2$ ratio. The action of the vanadium contact mass is no doubt due to the different stages of oxidation of the vanadium compounds. With a certain ratio of oxygen to $SO_2$ there will be established a certain ratio between the high stage oxidized vanadium compound and the low stage. In case the ratio of oxygen to $SO_2$ is reduced, it follows that a reduction of the vanadium compounds will also take place, forming one inactive part of the catalyst. Due to the retarding influence on the reaction caused by the lower content of oxygen, a larger amount of contact mass is required for getting the same conversion; whereas a decrease of the oxygen content in the gas reduces the active part of the catalyst. Thus a lowering of the oxygen content produces a reduction in the reaction of the vanadium mass. Where a low oxygen ratio is used, I have found the result to be that the hot spot in the converter moves further away from the gas entrant end, indicating a building up of inactive contact mass and the conversion at the same time further decreases rapidly, indicating inactivity of the mass. I have found that the optimum results, as aforesaid, are produced with an oxygen factor of from 1.3 to 1.6, the optimum ratio being, as indicated, 1.4 to 1. Although a larger oxygen content may be used, this of course is undesirable, since this increases the volume of gas to be treated, requiring larger converters and absorbers, etc.

The converted gases ($SO_3$) discharging from the converter 39 are led into the absorption tower 40, and if desired a part of these gases may be bypassed through the pipes 41 and 42 into and through the heat exchanger 37 for the purpose of supplying the heating medium for the heat exchanger, and conversely for the purpose of cooling the $SO_3$ gases to the desired absorption temperatures. The cooled $SO_3$ gas then returns through the pipe 43 to the pipe 44 leading to the absorption tower 40. In the absorption tower 40 the converted $SO_3$ gas is absorbed in the usual manner by means of acid which is supplied by a pump 45 and circulates through the pipe system *b*. The sulphuric acid produced in the absorption tower is led therefrom into the cooler 46.

In starting up the converter apparatus, a starting up furnace 47 may be utilized, this starting up furnace functioning to supply hot products of combustion to the heat exchanger 37 through the pipe 42; and at such time the valve 48 in the pipe line 41 is closed. Until the heat exchanger acquires the desired temperature, these combustion products may be vented through the outlet 49 to atmosphere.

The contact sulphuric acid system of the process may be self-contained in the supply of sulphuric acid for the absorber 40 and for the dehydrator 33. To accomplish this some of the product acid of the system obtained in the absorption apparatus 40 is circulated to the dehydrator 33 and serves as the make-up acid therefor, and conversely, the diluted sulphuric acid of the dehydrator 33 is returned to the absorber 40 and serves as supply for the make-up acid for the absorber. Accordingly the pipe system $a$ of the dehydrator 33 and the pipe system $b$ of the absorber 40 are interconnected by a pipe system $c$ through which the product acid is delivered to the dehydrator controlled by means of a valve 50 and a pipe system $d$ through which the drying or dehydrating acid is delivered from the dehydrator back to the absorber, the flow of the latter being controlled by means of a valve 51. The acid circulating in the absorber 40 may be a 98% acid and that circulating in the dehydrator 33 may be a 66° Baumé acid. Where high strength acid such as 20% or higher oleum is desired, water may be abstracted from the system by returning a part of the dehydrating acid to the gas generator 10' through the pipe line $e$ controlled by means of a valve 52, all as more specifically described and claimed in my companion application to Process of making concentrated sulphuric acid or oleum, Serial No. 574,244, filed November 11, 1931.

The practice of my improved process and the operation of the plant will in the main be fully apparent from the above detailed description thereof. The $SO_2$ gas may be generated without regard to the problem of moisture content thereof; and although moisture may be present in large amounts in the produced gases, the gases may be obtained at relatively low temperatures, and may be further cooled to atmospheric temperatures and therefore below the dew or condensation point of sulphuric acid without the liability or danger of forming sulphuric acid mist. The substantial absence of any formation of $SO_3$ in the gas generator renders unnecessary the use of the complicated treatment and apparatus of the cold purification process, although the gases issuing from the gas generator and subsequently treated are handled at low temperatures. With the process of the invention, substantially the only treatment of the gases required prior to the converter stage is to run the gases through the relatively small condenser 26 and to then dehydrate the gases along with the air admixed therewith. The air itself need not be pre-dried. By means of the process, moreover, catalytic conversion with vanadium contact mass is very efficiently accomplished.

While I have shown the process employed with acid sludge, of which different varieties may be used, such as liquid sludges and sludges of the more viscous and solid types, it will be understood that other sulphur containing bodies may be used instead. It will also be understood that the process may be employed for the concentration of any weak sulphuric acid or for the treatment of a byproduct sulphuric acid such as a weak sulphuric acid resulting from the pickling of steel. Heretofore acids of this type have been of little value, the strength of the acid being too low to permit of economical concentration. Such acids may be treated in my process by adding to them a reducing agent such as hydrocarbon oils. It will be further understood that while I prefer to embody all of the principles of the invention in the apparatus and process as described, the process may be widely varied to employ any one or a number of these principles in combination to effect any one or a number of the advantages flowing therefrom, all as I have attempted to define in the following claims.

I claim:

1. The process of producing sulphuric acid which consists in flowing heated gases over an acid sludge from the sulphuric acid purification of hydrocarbonaceous material to effect a reaction of the sludge with a consequent reduction of the sulphuric acid content or compounds thereof to $SO_2$ gas, the said heated gases containing a proportion of free oxygen of about 2 to 6%, the oxygen content being substantially less than that required for subsequent catalytic conversion of the $SO_2$ gas, in thereafter admixing the produced $SO_2$ gas with a further supply of oxygen, and in then converting the $SO_2$ and oxygen mixture to sulphuric anhydride.

2. The process of producing sulphuric acid which consists in flowing heated gases over an acid sludge from the sulphuric acid purification of hydrocarbonaceous material to effect a reaction of the sludge with a consequent reduction of the sulphuric acid content or compounds thereof to $SO_2$ gas, the said heated gases containing a proportion of free oxygen of about 2 to 6%, the said proportion of free oxygen being substantially less than that required for subsequent catalytic conversion of the $SO_2$ gas.

3. A method of producing sulphuric acid by the contact process which comprises subjecting acid sludge from the sulphuric acid purification of hydrocarbonaceous material to a heat treatment to produce $SO_2$ without distillation of $SO_3$, the treatment taking place in the presence of sufficient oxygen to prevent the presence in the $SO_2$ gas evolved of $H_2S$ but insufficient to effect conversion of the $SO_2$ to $SO_3$, cooling the gas to condense out moisture, admixing an amount of oxygen sufficient for the conversion of the $SO_2$ to $SO_3$, dehydrating the gas mixture and passing the mixture at reaction temperature over a contact sulphuric acid catalyst.

4. A method of producing sulphuric acid by the contact process which consists in subjecting a body containing $SO_4$ compounds and carbonaceous reducing agents, the mixture also including combustible hydrogen containing compounds, to a heat treatment to effect reduction to $SO_2$ in the presence of sufficient oxygen to prevent formation of $H_2S$ but insufficient to permit of conversion of the $SO_2$ formed to $SO_3$, maintaining the reaction conditions such as to substantially prevent distillation of $SO_3$, cooling the gas to a low temperature sufficient to condense out water, admixing with sufficient oxygen to permit conversion of the $SO_2$, dehydrating the mixture and passing the dehydrated gas at reaction temperature over a contact sulphuric acid catalyst.

INGENUIN HECHENBLEIKNER.